(12) United States Patent
Staschko et al.

(10) Patent No.: US 12,172,244 B2
(45) Date of Patent: Dec. 24, 2024

(54) TURNING DEVICE FOR PIPES AND PIPE ELEMENTS

(71) Applicant: EEW SPECIAL PIPE CONSTRUCTIONS GMBH, Rostock (DE)

(72) Inventors: Robert Staschko, Rostock (DE); Ulrich Sitz, Rostock (DE); Johannes Baum, Rostock (DE); Max Linde, Rostock (DE)

(73) Assignee: EEW SPECIAL PIPE CONSTRUCTIONS GMBH, Rostock (DE)

( * ) Notice: Subject to any disclaimer, the term of this patent is extended or adjusted under 35 U.S.C. 154(b) by 0 days.

(21) Appl. No.: 18/235,501

(22) Filed: Aug. 18, 2023

(65) Prior Publication Data
US 2024/0066641 A1   Feb. 29, 2024

(30) Foreign Application Priority Data
Aug. 25, 2022   (EP) ..................... 22192206

(51) Int. Cl.
*B23K 37/053*   (2006.01)
(52) U.S. Cl.
CPC ................. *B23K 37/0538* (2013.01)
(58) Field of Classification Search
CPC .. B23K 37/0538; B23K 37/04; B23K 37/053; B05B 13/0228; B05B 13/0214; F16L 3/16; F16L 3/02; F16L 58/00
USPC .................. 248/49, 53, 55, 58, 65
See application file for complete search history.

(56) References Cited

U.S. PATENT DOCUMENTS

| | | | | |
|---|---|---|---|---|
| 1,763,775 A * | 6/1930 | Gottwald | ............ | F16L 7/00 248/55 |
| 1,995,716 A * | 3/1935 | Millson | ............ | F16L 7/00 285/119 |
| 2,005,701 A * | 6/1935 | Spackman | ............ | F16L 7/00 138/108 |
| 3,735,973 A * | 5/1973 | Petrie | ............ | F16L 3/00 248/55 |
| 5,028,019 A * | 7/1991 | Hardtke | ............ | F16L 3/18 248/55 |
| 2006/0115189 A1* | 6/2006 | Koch | ............ | F16L 3/16 384/50 |
| 2010/0287957 A1* | 11/2010 | Liu | ............ | F16L 7/00 62/50.7 |

FOREIGN PATENT DOCUMENTS

DE   10 2022 103 490   8/2023

* cited by examiner

*Primary Examiner* — Muhammad Ijaz
(74) *Attorney, Agent, or Firm* — GREENBLUM & BERNSTEIN, P.L.C.

(57) ABSTRACT

Provided is a turning device for turning pipes with a large diameter about their longitudinal axis. The turning device includes a base body and two supporting devices that are arranged on the base body. Each supporting device includes a pedestal and at least one rocker element that is pivotably mounted in a receptacle of the pedestal. The pedestal is connected to the base body. The rocker elements each include one or more rollers. The turning device adapts to different pipe diameters as a result of the rocker elements, so that no exchanging of the turning device is necessary and multiple turning devices do not need to be kept on hand for different pipe diameters.

8 Claims, 2 Drawing Sheets

TURNING DEVICE FOR PIPES AND PIPE ELEMENTS

The invention relates to a turning device for turning pipes with a large diameter about their longitudinal axis according to the preamble of claim 1.

Large pipes, in particular made of longitudinal-seam-welded and girth-seam-welded steel sheets, having a considerable diameter are used, for example, in the petroleum industry or in the production of large structures made of metal. An important field of application is also foundation construction for offshore plants, in particular wind turbines. For large pipes that are used in the offshore sector, for example as monopiles or tripods, pipe diameters of greater than 6 m and now greater than 9 m are no longer a rarity. Compared to the pipe diameter, these large pipes are embodied to be very thinly walled.

Prior to use, the pipes are produced in various work steps, and are prepared for use depending on the application purpose. For use in the offshore sector, for example, anti-corrosion coatings are applied in order to protect the pipe against corrosion in salt water. Given the dimensions of the pipe, the coating takes place while the pipe is in a lying position. In order to be able to coat the entire surface, the pipe must be turned about its longitudinal axis during the coating process. For this purpose, the pipe is positioned on turning devices. The turning devices must have an adequate load-bearing capacity in order to be able to carry the very large and heavy pipes. Since the pipes have, in comparison with the large diameters and large masses, only a small wall thickness, they possess a low radial rigidity. Thus, there is the risk of indentation of or damage to the surface of the pipe when it is supported on the turning device or during the turning. Excessive stresses on the pipe can also occur when the pipe is being turned, which stresses cause irreversible damage to the pipe. In light of the current large-pipe weights, many conventional turning devices already lack an adequate load-bearing capacity. In addition, some turning devices are designed for exactly one pipe diameter, so that different turning devices must be kept on hand for pipes with different pipe diameters.

DE 10 2022 103 490 describes a turning device for turning pipes with a large diameter about their longitudinal axis. The multi-turning device comprises 6 to 10 rollers, wherein the rotation axes of the rollers are arranged on a circular arc. The rollers are lined up alongside one another on a base frame. With the described turning device, it is possible to rotate pipes having pipe diameters of at least 6 m in a safe and damage-free manner despite their weight and their size, without resulting in any indentations of or damage to the pipe surface. However, the turning device has a large number of components and rollers, so that it has a high dead weight and a relatively large amount of material is required for production.

The object of the invention is to provide a turning device that overcomes the aforementioned disadvantages and in particular enables a damage-free support and safe and uniform turning of pipes, such as monopiles or steel pipes, having a diameter of at least 6 m, without resulting in a deformation of the pipe, such as depressions or indentations. The turning device should also be versatile to handle different pipe diameters, and should be constructed from relatively few components.

The main features of the invention are recited in the characteristic part of claim 1.

Further embodiments are the subject matter of the dependent claims or are described below.

The turning device for turning pipes with a large diameter about their longitudinal axis according to the invention comprises a base body and two supporting devices that are arranged on the base body, wherein each supporting device comprises a pedestal and at least one rocker element. The rocker element is pivotably mounted on an axle. The axle is arranged in a receptacle of the pedestal, and the pedestal is connected to the base body. Each of the two supporting devices has a first rocker element and a second rocker element. The first rocker element comprises a first axle and is pivotably mounted on the first axle in the receptacle of the pedestal, wherein a main pivot axis of the supporting device runs through the first axle. The first rocker element comprises two main pivot arms that extend out from the first axle and are arranged at a fixed angle to one another. A first main pivot arm of the first rocker element has a side arm. The side arm is embodied as a continuation of the pivot arm and extends said pivot arm. At the outer end of the side arm that is located farthest away from the first axle, a roller axle is arranged on which a roller is rotatably mounted on the side arm. A second main pivot arm of the first rocker element comprises at an end a receptacle for a second axle. A second rocker element is pivotably mounted on the second axle. A secondary pivot axis of the supporting device runs through the second axle. The second rocker element comprises two pivot arms which extend out from the second axle and are arranged at a fixed angle to one another. On each pivot arm of the second rocker element, one roller axle each is arranged on which a roller is rotatably mounted on the pivot arm. The main pivot axis and the secondary pivot axis run parallel to one another. The supporting device can be pivoted about both pivot axes independently of one another. Each roller has a roller axle and a rotation axis running through the roller axle, wherein the rotation axes of the rollers run parallel to one another and parallel to the longitudinal axis of a pipe supported on the turning device. Only the rollers form the contact points for a pipe, so that when a pipe is being positioned on the turning device, only the rollers bear against the pipe surface.

The base body constitutes the base of the turning device, which base stands on the ground or on a transport vehicle or other underlying surface. The base body has a top side on which the supporting devices are mounted. The top side is preferably embodied as a planar surface, for example having a roughly rectangular outline. The planar surface can, for example, be embodied as a sliding surface for the continuously variable adjustment of the supporting devices and/or with equidistantly distributed bores for fixing the carrying devices in place by means of plug bolts. The base body can, on the bottom side thereof, comprise feet with which the base body stands on the subsurface. Other components, for example such as attachment elements for the attachment to a crane, can additionally be provided.

Preferably, the roller axles are arranged at the outermost end of the side arm from the first axle and respectively at the outermost end of the pivot arms of the second rocker element from the second axle, so that the rollers protrude past the side arm and the second rocker element and the rollers form the contact points for the pipe in the direction of the pipe.

In one embodiment, the rollers are designed as idling rollers and comprise no drive. In another embodiment, the rollers are designed as driven rollers.

Each of the two supporting devices comprises a pedestal and two rocker elements, as well as a total of three rollers. The pedestal of the supporting device comprises a receptacle that is embodied as an axle bearing. In the receptacle, a first rocker element is pivotably mounted on a first axle, wherein the main pivot axis of the supporting device runs through the first axle. The first rocker element comprises two main pivot arms. The main pivot arms preferably have an equal length and have the same basic shape. It is furthermore preferred if they are connected to one another in an integral manner. The first main pivot arm of the first rocker element has a side arm. A roller is arranged at the end of the side arm. The roller comprises a roller axle on which it is rotatably mounted on the side arm. The second main pivot arm comprises a receptacle for a second axle, wherein the receptacle is embodied as an axle bearing. A second rocker element is mounted on said second axle. The second rocker element is arranged at an end of the second main pivot arm. A secondary pivot axis of the supporting device runs through the second axle. The second rocker element comprises two pivot arms that are arranged at a fixed angle to one another. The pivot arms preferably have an equal length and have the same basic shape. It is furthermore preferred if they are connected to one another in an integral manner. One roller each is arranged at the ends of the pivot arms of the second rocker element. Each roller comprises a roller axle on which it is rotatably mounted on the pivot arm. In a preferred embodiment, the pivot arms of the second rocker element are embodied in mirror symmetry, wherein the plane of symmetry runs through the second axle.

The rocker element preferably comprises at least two parallel side members that are connected to one another, wherein the roller is arranged between the side members. In one embodiment, the first rocker element comprises four parallel side members that are in large part congruent. The side members comprise both the main pivot arms and the side arm. In this embodiment, there are two outer side members, which form the outer sides of the first rocker element, and two inner side members. The two inner side members can be connected to one another via one or more stabilizing elements. The outer roller, that is, the roller mounted on the side arm, is then arranged between the two inner side members. The first axle and the second axle lead through all four side members, as does the roller axle of the outer roller.

In one embodiment, the second rocker element preferably comprises two parallel side members that are in large part congruent. The side members can be connected to one another via one or more stabilizing elements. The side members form the two pivot arms of the second rocker element. The second axle and the roller axles lead through both side members. The side members of the second rocker element are, for example, respectively arranged between an outer and an inner side member of the first rocker device.

In one embodiment, the pedestal of the supporting device is connected in a fixed manner to the base body, for example is welded to the base body.

In another embodiment, the pedestal of the supporting device is adjustably mounted on the base body; it is preferably mounted in openings of the base body using connecting elements. In this embodiment, the pedestal is releasably attached to the base body, so that the position thereof on the base body can be adjusted. For this purpose, the base body preferably comprises grid-shaped openings, slot-shaped openings, or a mounting rail to receive the connecting elements, so that a continuously variable or incremental adjustment of the spacing between the supporting devices is possible on the base body. It is also possible to connect a pedestal of a first supporting device to the base body in a fixed manner, and to design the pedestal of a second supporting device to be adjustable. In this embodiment, the spacing can only be attained by adjusting the position of a supporting device on the base body, and a low assembly effort is thus achieved.

The supporting devices are preferably positioned on the base body in mirror symmetry in relation to a center axis C of the base body, wherein the side arm of the first rocker element is respectively arranged towards the outer side of the base body and the second rocker elements are respectively arranged on the side facing the center axis. Both second rocker elements are thus each arranged on the inner side of the supporting device towards the center of the turning device, whereas the side arms of the first rocker element respectively point as a load arm to the outer side of the turning device.

The turning device according to the invention is used for turning (rotating about the longitudinal axis) longitudinal-seam-welded and girth-seam-welded steel pipes having large diameters, which are referred to as large pipes, and large-pipe elements having a pipe diameter of at least 6 m, preferably at least 8 to 10 m. Even pipe diameters up to 12 m and beyond, such as those which occur in floating offshore support structures (spar buoys) for example, can be turned using the turning device. Longitudinal-seam-welded large-pipe elements are manufactured from steel sheet panels. The sheet panel blank is first bent into a round shape and the open edges of the resulting open-seam pipe element are tacked together using a temporary seam (tack weld) that is removed again later in the production process. The tack-welded pipe element is positioned in a welding bay, and the inner seam is made on the pipe element first and then the outer seam. The pipe can then be processed further, for example coated.

In a typical construction, the pipes have a wall thickness of 35 mm to 250 mm, preferably 40 to 200 mm, particularly preferably 50 mm to 170 mm. Large pipes and large-pipe elements with a diameter of 6 m to 10 m preferably have a wall thickness of 50 mm to 170 mm. A large-pipe element typically has a length of 2 m to 4.2 m. The pipes are welded together from a plurality of pipe elements and thereby have lengths of up to 120 m. In these dimensions, the pipes weigh on average over a thousand tons. With the turning device according to the invention, it is possible to turn these pipes in a safe and damage-free manner despite their weight and their size, without resulting in indentations of or damage to the pipe surface.

The base body and, where appropriate, the supporting devices are preferably composed of steel, particularly preferably of structural steel. It is particularly preferred if the base body and the supporting devices are composed of steel.

The supporting device can pivot about two axes, namely the main pivot axis and the secondary pivot axis, and can thus adapt to the diameter of the positioned pipe. By pivoting the rocker elements, the position of the rollers is altered. When the pipe is being positioned on the turning device, the pipe first touches the roller in the second rocker element that is directed towards the center. Due to the weight of the pipe, the roller is pressed downward and the second rocker element pivots downward about the secondary pivot axis, until the other roller arranged in the second rocker element likewise bears against the pipe surface. At the same time, as a result of the weight, the first rocker element is also pressed downward and pivots about the main pivot axis, also downward towards the center, until the outer roller on the side arm also bears against the pipe surface. The magnitude of the pivot about the pivot axis thereby depends on the pipe diameter and the spacing of the supporting devices from one another. The rocker elements respectively pivot about the pivot axis as a rotation point, wherein the pivot movement occurs by an angle of deflection all the way to a stop.

The turning device according to the invention adapts to different pipe diameters as a result of the rocker elements, so that no exchanging of the turning device is necessary and multiple turning devices do not need to be kept on hand for different pipe diameters. This enables a flexible use through the variability of the turning device for different pipe diameters, without any modification effort. In the case of large differences between the pipe diameters, the turning device can, in the embodiment with adjustable pedestals, also be adapted to other pipe diameters with few modification steps.

Furthermore, an object of the invention is a system comprising at least 2 turning devices according to one of patent claims 1 through 7 and a pipe having a pipe diameter of at least 8 m.

The turning device according to the invention is explained in greater detail in exemplary embodiments based on the drawings. In the following:

Figure 1:
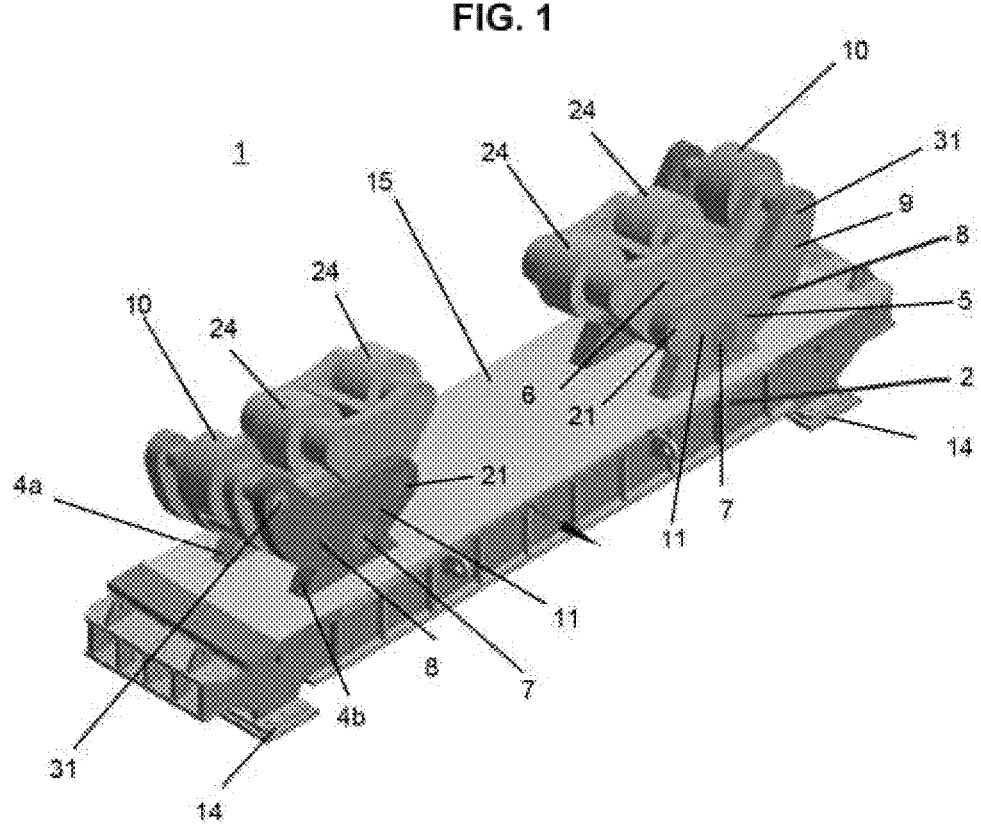
FIG. 1 shows an embodiment of a turning device according to the invention.

FIG. 1 shows a perspective view of a turning device 1 according to the invention. The turning device comprises a base body 2 and two supporting devices 3. The supporting devices each have a pedestal 4. The pedestal 4 is formed from two pedestal elements 4a, 4b, each of which has a triangular longitudinal section, that is, is designed as a three-sided prism. The pedestal 4 is attached to the top side 15 of the base body 2. A first rocker element 5 is respectively pivotably mounted on the pedestal 4 via a first axle 7. The first rocker element 5 has two main pivot arms 8 and 11. A side arm 9 is arranged on the first main pivot arm 8. In this embodiment, the first main pivot arm 8 and the side arm 9 are connected to one another in an integral manner, and the side arm 9 constitutes a continuation of the first main pivot arm. At the end of the side arm 9, a roller 10 is rotatably mounted on a roller axle 31. The second main pivot arm 11 is oriented towards the center of the turning device, that is, towards the other supporting device. At the end of the second main pivot arm 11, a receptacle for a second axle 21 is arranged. A second rocker element 6 is pivotably mounted on the second axle 21. The second rocker element comprises two pivot arms. At the ends of the pivot arms, one roller 24 each is rotatably mounted on a roller axle 30. The base body 2 stands on the ground. For this purpose, it comprises feet 14 that stand on the ground as a contact area.

Figure 2:
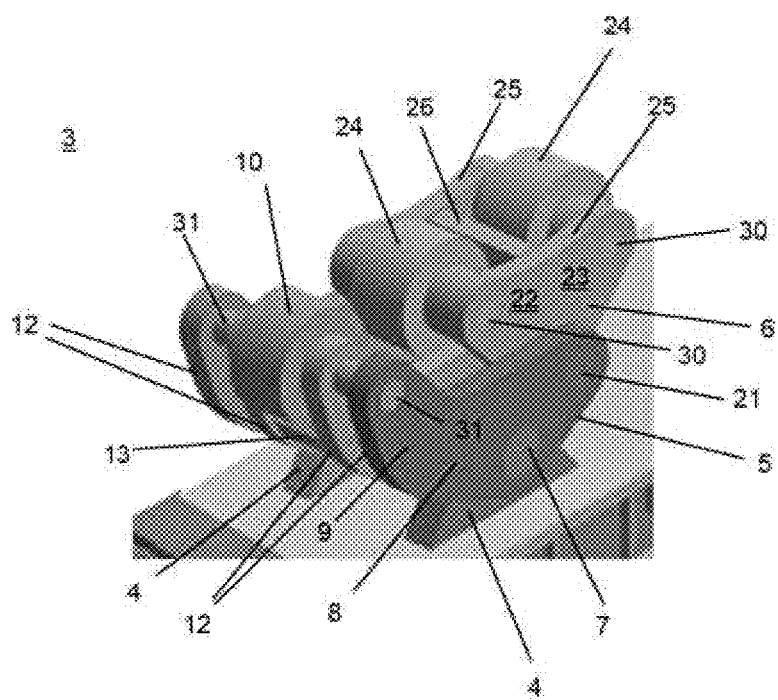
FIG. 2 shows a section of a turning device according to the invention in a perspective view.

FIG. 2 shows a perspective view of a supporting device 3 from FIG. 1. The first rocker element 5 is mounted on the pedestal 4 via the first axle 7. The first main pivot arm 8 extends to the left in the figure, outwardly away from the center of the turning device. The first pivot arm 8 is extended by the side arm 9. The first rocker element 5 is formed by four side members 12 arranged parallel to one another and connected to one another, which side members 12 comprise both the main pivot arms and the side arms. There are two outer side members, which form the outer sides of the first rocker element, and two inner side members. The two inner side members 12 are connected to one another via a stabilizing element 13. The outer roller 10 is arranged between the two inner side members 12. The first axle 7 leads through all four side members, as do the second axle 21 and the roller axle 31 of the outer roller 10. The second rocker element 6 is pivotably mounted on the second axle 21. The second rocker element 6 is formed from two side members 25 arranged parallel to one another and connected to one another. The side members 25 are connected to one another centrally between the rollers 24 via a stabilizing element 26. The side members form the two pivot arms of the second rocker element. The second axle 21 and the roller axles 30 lead through both side members 25. Both the second rocker elements are each arranged on the inner side of the supporting device towards the center of the turning device, whereas the side arms of the first rocker element respectively point as a load arm to the outer side of the turning device. The side members 25 of the second rocker element are respectively arranged between an outer and an inner side member 12 of the first rocker device.

Figure 3:
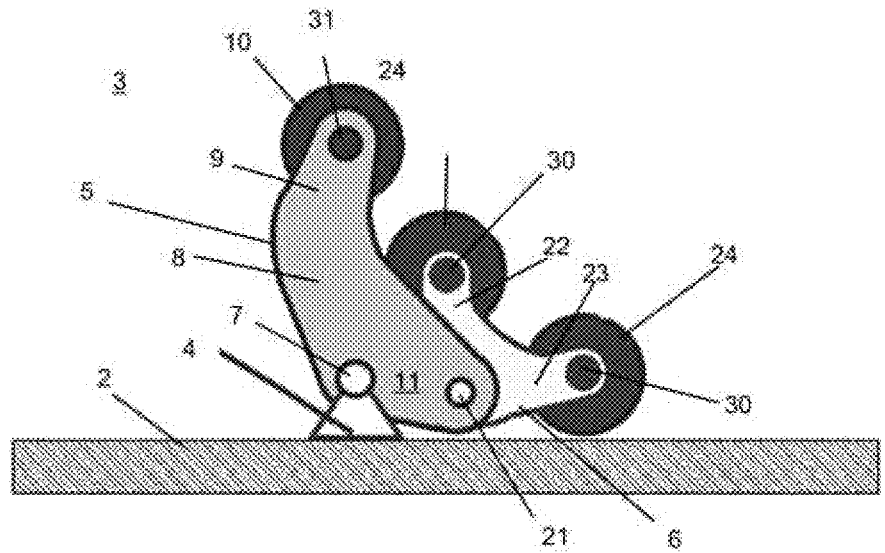
FIG. 3 shows a section of a turning device according to the invention in a side view.

FIG. 3 shows a supporting device 3 according to the invention in a side view. The first rocker element 5 has pivoted to the right, so that the side arm 9 on the first main pivot arm 8 points upward. The short main pivot arm 11 has pivoted downward. The second rocker element 6 is oriented such that it is centered. In this embodiment, the two pivot arms 22 and 23 of the second rocker element are designed to be in mirror symmetry.

Figure 4:
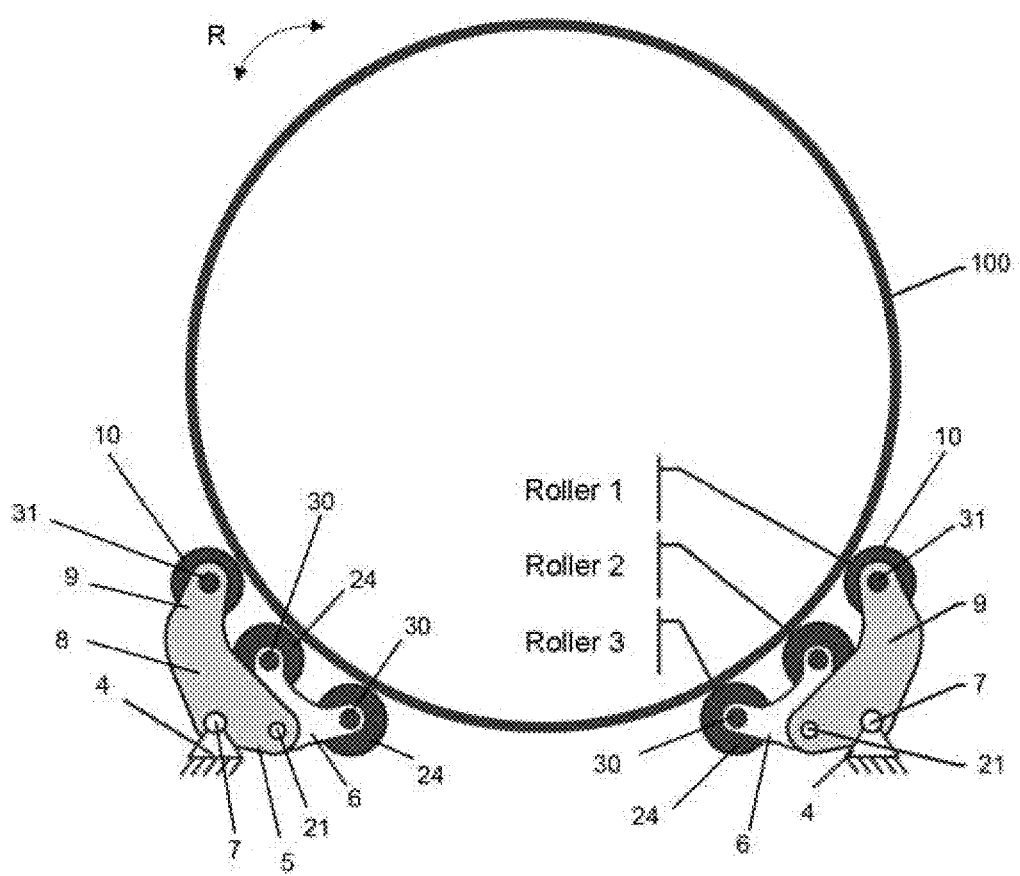
FIG. 4 shows a side view of a turning device according to the invention with a pipe in a lying position.

FIG. 4 shows a turning device 1 according to the invention with a pipe 100 in a lying position in a schematic illustration. The turning device 1 comprises two supporting devices 3. The supporting devices 3 have a pedestal 4 that is mounted on a base body 2 (not illustrated). The supporting devices 3 have each pivoted towards the pipe, that is, towards the center axis of the base body 2, on the main pivot axis, which runs through the first axle 7. The pipe 100 rests solely on the six rollers 10 and 24 of the turning device. The rollers 10 and 24 form the sole contact points for the pipe 100, so that when a pipe 100 is being positioned on the turning device, only the rollers bear against the pipe surface.

Each roller has a roller axle and a rotation axis running through the roller axle. The rotation axes of the rollers run parallel to one another and parallel to the longitudinal axis of a pipe supported on the turning device. The rotation direction of the pipe is indicated by the arrow R.

The invention is not limited to any one of the embodiments described above, but rather can be modified in many and varied ways.

All features and advantages arising from the claims, the specification, and the drawing, including constructive details, spatial arrangements, and method steps, can be essential to the invention both separately and also in the most widely different combinations.

LIST OF REFERENCE SYMBOLS

Turning device 1
Base body 2
Supporting device 3
Pedestal 4
First rocker element 5
Second rocker element 6
First axle 7
First main pivot arm 8
Side arm 9
Roller 10
Second main pivot arm 11
Side member 12
Stabilizing element 13
Foot 14
Top side of base body 15

Second axle 21
Pivot arm 22
Pivot arm 23
Roller 24
Side member 25
Stabilizing element 26
Roller axle 30
Roller axle 31
Pipe 100
Rotation direction of pipe R

What is claimed is:

1. A turning device for turning pipes with a large diameter about their longitudinal axis, comprising:
   a base body,
   two supporting devices that are arranged on the base body, wherein each supporting device comprises a pedestal and at least one rocker element that is pivotably mounted in a receptacle of the pedestal and
   the pedestal is connected to the base body, wherein
   each supporting device comprises a first rocker element and a second rocker element,
   the first rocker element comprises a first axle and is pivotably mounted on the first axle in the receptacle of the pedestal, wherein a main pivot axis runs through the first axle,
   the first rocker element comprises two main pivot arms that extend out from the first axle and are arranged at a fixed angle to one another,
   a first main pivot arm of the first rocker element comprises a side arm and, at the outer end of the side arm, a roller axle is arranged on which a roller is rotatably mounted on the side arm,
   a second main pivot arm of the first rocker element comprises at an end a receptacle for a second axle,
   a second rocker element is pivotably mounted on the second axle, wherein a secondary pivot axis runs through the second axle,
   the second rocker element comprises two pivot arms which extend out from the second axle and are arranged at a fixed angle to one another,
   on each pivot arm of the second rocker element, one roller axle each is arranged and a roller is rotatably mounted on the pivot arm on each roller axle,
   the main pivot axis and the secondary pivot axis run parallel to one another,
   each roller has a roller axle and a rotation axis running through the roller axle, and the rotation axes of the rollers run parallel to one another and parallel to the longitudinal axis of a pipe supported on the turning device, and
   the rollers form contact points for the pipe so that when the pipe is being positioned on the turning device, only the rollers bear against the pipe surface.

2. The turning device according to claim 1, wherein the pivot arms of the second rocker element are embodied to be in mirror symmetry to one another.

3. The turning device according to claim 1 or 2, wherein the rocker element comprises at least two parallel side members that are connected to one another and the roller is arranged between the side members.

4. The turning device according to claim 1, wherein the pedestal is connected to the base body in a fixed manner.

5. The turning device according to claim 1, wherein the pedestal is mounted, is adjustably mounted, on the base body using connecting elements and the base body comprises grid-shaped openings, slot-shaped openings, or a mounting rail to receive the connecting elements.

6. The turning device according to claim 1, wherein the supporting devices are positioned on the base body in mirror symmetry in relation to a center axis of the base body, wherein the side arm of the first rocker element is respectively arranged towards the outer side of the base body and the second rocker elements are respectively arranged on the side facing the center axis.

7. The turning device according to claim 1, wherein the roller axles are arranged at the outermost vertical end of the side arm and of the second rocker element and the rollers protrude past the side arm and the second rocker element so that the rollers form the outermost contact point in the direction of the pipe.

8. A system comprising at least two turning devices according to claim 1 and a pipe having a pipe diameter of at least 8 m.

* * * * *